(12) United States Patent
Semple et al.

(10) Patent No.: US 6,621,830 B1
(45) Date of Patent: Sep. 16, 2003

(54) VARIABLE RATE SUBSCRIBER BUS

(75) Inventors: Brian Semple, Novato, CA (US); Jason Dove, Novato, CA (US); Paul Franceschini, Petaluma, CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/470,141

(22) Filed: Dec. 22, 1999

(51) Int. Cl.$^7$ ............................... H04J 3/16; H04J 3/22
(52) U.S. Cl. ........................................ 370/468; 370/489
(58) Field of Search ................................. 370/232, 233, 370/234, 235, 265, 324, 330, 421, 423, 468, 489, 503, 510, 304, 350, 466, 467

(56) References Cited

U.S. PATENT DOCUMENTS

| | | | | |
|---|---|---|---|---|
| 5,544,170 A | * | 8/1996 | Kasahara | 370/253 |
| 5,809,029 A | * | 9/1998 | Deschaine et al. | 370/467 |
| 5,875,191 A | * | 2/1999 | Deschaine et al. | 370/466 |
| 5,883,898 A | * | 3/1999 | Deschaine et al. | 370/467 |
| 5,886,994 A | * | 3/1999 | Deschaine et al. | 370/467 |
| 5,926,480 A | * | 7/1999 | Deschaine et al. | 370/401 |

FOREIGN PATENT DOCUMENTS

WO         WO 00/11880        *    3/2000

* cited by examiner

*Primary Examiner*—Wellington Chin
*Assistant Examiner*—Jamal A. Fox
(74) *Attorney, Agent, or Firm*—Richard A. Mysliwiec; V. Lawrence Sewell

(57) ABSTRACT

A variable rate subscriber bus is adaptable to carry communications traffic in the forms of DS0, T1 or DS1 formats between a channel bank and a channel card at any one of a plurality of predetermined data rates. The data rate for the variable rate subscriber bus is selected according to the type and capacity of the channel card. The variable rate subscriber bus is capable of supporting high data rate traffic for high density channel cards while maintaining compatibility with conventional low density channel cards.

150 Claims, 8 Drawing Sheets

VARIABLE RATE SUBSCRIBER BUS

BACKGROUND OF THE INVENTION

1. Field of the Invention

The present invention relates to telecommunications, and more particularly, to a subscriber bus interface in a telecommunications system.

2. Background

The telecommunications industry has developed schemes for transmitting telephony signals in digital formats, for example, in the form of time division multiplexed (TDM) signals for transmission over a physical layer interface, such as a conventional subscriber bus interface (SBI) in a synchronous optical network (SONET). The SONET uses an industry-standard framed transmission format in which communications signals in the form of data bits are carried within SONET frames each having a duration of 125 $\mu$s. Each SONET frame is divided into a plurality of time slots for carrying payload data bits representing digitized telephony signals for conventional telephone services.

An example of a conventional telephone service is a plain old telephone service (POTS), which uses an industry-standard digital format that is known to a person skilled in the art. Payload data bits representing the telephony signals can be carried within a plurality of conventional Digital Signal 0 (DS0) cells which are assigned to the time slots within the SONET frames. An industry-standard DS0 cell, which is known to a person skilled in the art, is transmitted over a conventional SBI at a data rate of 64 kilobits per second (Kbps) per channel.

In a conventional channel bank for transporting POTS traffic, a conventional SBI typically operates at a fixed data rate of 2.048 megabits per second (Mbps) for transporting DS0 cells. At a data rate of 2.048 Mbps, the conventional SBI supports 24 DS0 channels with associated signaling, timing and data link cells. Although this data rate is adequate for POTS traffic using low-density quadruple or octal POTS channel cards and single T1 channel cards, a conventional SBI running at the fixed data rate of 2.048 Mbps is incapable of interfacing with higher-density channel cards such as quadruple T1 channel cards and asynchronous transfer mode (ATM) optical line units (AOLUS) which operate at higher data rates.

Therefore, there is a need for a subscriber bus which is capable of operating at data rates higher than the fixed data rate of 2.048 Mbps provided by a conventional fixed-rate subscriber bus interface. Furthermore, it is desirable that a subscriber bus be able to support multiple data rates for compatibility with a variety of high density channel cards, as well as the standard data rate of 2.048 Mbps for compatibility with existing channel units, including low-density quadruple or octal POTS channel cards and single T1 channel cards.

SUMMARY OF THE INVENTION

In accordance with the present invention, a variable rate subscriber bus roughly comprises:

(a) a clock channel capable of transferring a clock signal at a predetermined clock frequency; and (b) a plurality of Digital Signal 0 (DS0) channels capable of transferring a plurality of DS0 cells at a selected one of a plurality of predetermined data rates for transferring the DS0 cells, the predetermined data rates including a basic data rate and at least one higher data rate, each of the DS0 cells carrying a plurality of data bits which are transferred at the selected data rate, the clock signal providing a timing reference to the data bits at any one of the predetermined data rates selected for transferring the DS0 cells.

In an embodiment, the subscriber bus further comprises a frame synchronization channel capable of transferring a timing pulse defining a synchronous optical network (SONET) frame. In a further embodiment, the DS0 cells are synchronized at a frame rate of 8 KHz based upon the SONET frame which has a duration of 125 $\mu$s. In another embodiment, the subscriber bus further comprises a superframe synchronization channel capable of transferring a timing pulse defining a subscriber bus superframe for synchronizing the DS0 cells. In a further embodiment, the DS0 cells are synchronized at a frame rate of 1 KHz based upon the subscriber bus superframe, which consists of 8 SONET frames and has a duration of 1 ms.

In an embodiment, the subscriber bus according to the present invention is capable of supporting the basic data rate, which is the standard data rate of 2.048 Mbps for compatibility with conventional low-density channel cards, as well as a plurality of higher data rates for compatibility with a variety of higher-density channel cards. In an embodiment, each of the higher data rates is an integral multiple of the basic data rate. In a further embodiment, the integral multiple is an integral power of two. In an embodiment, the predetermined data rates which the subscriber bus according to the present invention is capable of supporting comprises the basic data rate of 2.048 Mbps and the higher data rates of 4.096 Mbps, 8.192 Mbps and 16.384 Mbps. In an embodiment, the predetermined clock frequency is 4.096 MHz to provide a timing reference for the DS0 cells at any one of the predetermined data rates.

In an embodiment in which the DS0 cells are transferred at the basic data rate of 2.048 Mbps, eight odd time slots and eight even time slots are provided within each of the DS0 cells. The odd and even time slots are interleaved with each other. In an embodiment, eight data bits of a data byte are assigned only to the odd time slots within each of the DS0 cells.

In an embodiment in which the subscriber bus according to the present invention operates at a data rate of 4.096 Mbps, sixteen time slots are provided within each of the DS0 cells. In this embodiment, two data bytes each consisting of eight data bits are assigned to each of the DS0 cells. In an embodiment, a first one of the two data bytes is assigned to a first half of the sixteen time slots, and a second one of the two data bytes is assigned to a second half of the sixteen time slots subsequent in sequence to the first half.

In an embodiment in which the subscriber bus according to the present invention operates at a data rate of 8.192 Mbps, thirty-two time slots are provided within each of the DS0 cells. In this embodiment, four data bytes each consisting of eight data bits are assigned to each of the DS0 cells. In an embodiment, the four data bytes are byte-interleaved with each other within each of the DS0 cells.

In an embodiment in which the subscriber bus according to the present invention operates at a data rate of 16.384 Mbps, sixty-four time slots are provided within each of the DS0 cells. In this embodiment, eight data bytes each consisting of eight data bits are assigned to each of the DS0 cells. In an embodiment, the eight data bytes are byte-interleaved with each other within each of the DS0 cells.

In an embodiment, the SONET frame comprises a first cell slot and a first set of three DS0 cells immediately following the first cell slot. In a further embodiment, the SONET frame further comprises a signaling cell immediately following the first set of three DS0 cells and a second set of three DS0 cells immediately following the signaling cell. In yet a further embodiment, the SONET frame further comprises a framing cell immediately following the second set of three DS0 cells.

In an embodiment in which the cell slots in the SONET frame carry standard DS0 cells, the first cell slot comprises a reserved slot. In an alternate embodiment in which the cell slots assigned to carry DS0 cells in the SONET frame carry T1 cells, the first cell slot in the SONET frame comprises a T1 protect state slot. Because a T1 cell is simply a concatenated DS0 cell, the cell format for the variable rate subscriber bus according to the present invention is also applicable to the transferring of T1 cells over the variable rate subscriber bus at any one of the selectable data rates.

The present invention also provides a method of data transmission over a variable rate subscriber bus. The method roughly comprises the steps of:

(a) providing a DS0 cell;

(b) providing a clock signal at a predetermined clock frequency;

(c) providing a plurality of predetermined data rates for the subscriber bus, the predetermined data rates including a basic data rate and at least one higher data rate;

(d) selecting one of the predetermined data rates as a selected data rate for transmitting the data; and (e) assigning a plurality of data bits to the DS0 cell in dependence upon the selected data rate.

In an embodiment, the method according to the present invention further comprises the step of providing a SONET frame for synchronizing the DS0 cell. In a further embodiment, the method comprises the step of synchronizing a plurality of DS0 cells at a frame rate of 8 KHz based upon the SONET frame which has a duration of 125 $\mu$s. In another embodiment, the method according to the present invention further comprises the step of providing a subscriber bus superframe for synchronizing the DS0 cells. In a further embodiment, the DS0 cells are synchronized at a frame rate of 1 KHz based upon the subscriber bus superframe which consists of 8 SONET frames and has a duration 1 ms.

In an embodiment, the predetermined data rates include the basic data rate and a plurality of higher data rates, each of the higher data rates being an integral multiple of the basic data rate. In a further embodiment, the integral multiple is an integral power of two. In an embodiment, the predetermined data rates include the basic data rate of 2.048 Mbps for supporting conventional low-density channel cards and the higher data rates of 4.096 Mbps, 8.192 Mbps, and 16.384 Mbps for supporting higher-density channel cards. In an embodiment, the predetermined clock frequency is 4.096 MHz to provide a timing reference for DS0 cells at any one of the predetermined data rates selected for the variable rate subscriber bus.

In an embodiment in which the DS0 cell is transmitted at the basic data rate of 2.048 Mbps, the method according to the present invention further comprises the step of providing eight odd time slots and eight even time slots within the DS0 cell, the odd and even time slots interleaved with each other. In an embodiment, the method further comprises the step of assigning a data byte consisting of eight data bits only to the odd time slots within the DS0 cell.

In an embodiment in which the DS0 cell is transmitted at a data rate of 4.096 Mbps, the method according to the present invention further comprises the step of providing sixteen time slots within the DS0 cell. Two data bytes each consisting of eight data bits are assigned to the DS0 cell. In an embodiment, a first one of the data bytes is assigned to a first half of the sixteen time slots and a second one of the data bytes is assigned to a second half of the sixteen time slots subsequent in sequence to the first half.

In an embodiment in which the DS0 cell is transmitted at a data rate of 8.192 Mbps, the method according to the present invention further comprises the step of providing thirty-two time slots within the DS0 cell. Four data bytes each consisting of eight data bits are assigned to the DS0 cell. In an embodiment, the method further comprises the step of byte-interleaving the four data bytes within the DS0 cell.

In an embodiment in which the DS0 cell is transmitted at a data rate of 16.384 Mbps, the method according to the present invention further comprises the step of providing sixty-four time slots within the DS0 cell. In this embodiment, eight data bytes each consisting of eight data bits are assigned to the DS0 cell. In an embodiment, the method further comprises the step of byte-interleaving the eight data bytes within the DS0 cell.

In an embodiment, the method according to the present invention further comprises the steps of providing a SONET frame, dividing the SONET frame into a plurality of cell slots comprising a first cell slot and a plurality of subsequent cell slots in temporal sequence, and assigning a first set of three DS0 cells to three of the cell slots immediately following the first cell slot. In a further embodiment, the method according to the present invention further comprises the steps of assigning a signaling cell to a fifth one of the cell slots immediately following the first set of three DS0 cells and assigning a second set of three DS0 cells to three of the cell slots immediately following the signaling cell.

In a further embodiment, the method according to the present invention further comprises the step of assigning a framing cell to a ninth one of the cell slots immediately following the second set of three DS0 cells. In an embodiment in which standard DS0 cells are assigned to the SONET frame, the first cell slot comprises a reserved slot. In an alternate embodiment in which the variable rate subscriber bus is capable of supporting a plurality of T1 channels, the SONET frame comprises a plurality of T1 cells, which are concatenated DS0 cells. In this embodiment, the first cell slot comprises a T1 protect state slot. In an embodiment, three T1 cells are assigned to three of the cell slots immediately following the T1 protect state slot.

Advantageously, the variable rate subscriber bus according to the present invention is capable of supporting POTS traffic or T1 traffic at multiple data rates. The subscriber bus according to the present invention is capable of transporting POTS or T1 traffic at higher data rates for compatibility with higher-density channel cards, such as quadruple T1 channel cards or asynchronous transfer mode (ATM) optical line units (AOLUs). Furthermore, the subscriber bus according to the present invention is also capable of supporting POTS or T1 traffic at the basic data rate of 2.048 Mbps for compatibility with existing conventional channel cards, such as low-density quadruple or octal POTS channel cards or single T1 channel cards.

BRIEF DESCRIPTION OF THE DRAWINGS

The present invention will be described with respect to particular embodiments thereof, and references will be made to the drawings in which.

DETAILED DESCRIPTION

Figure 1:
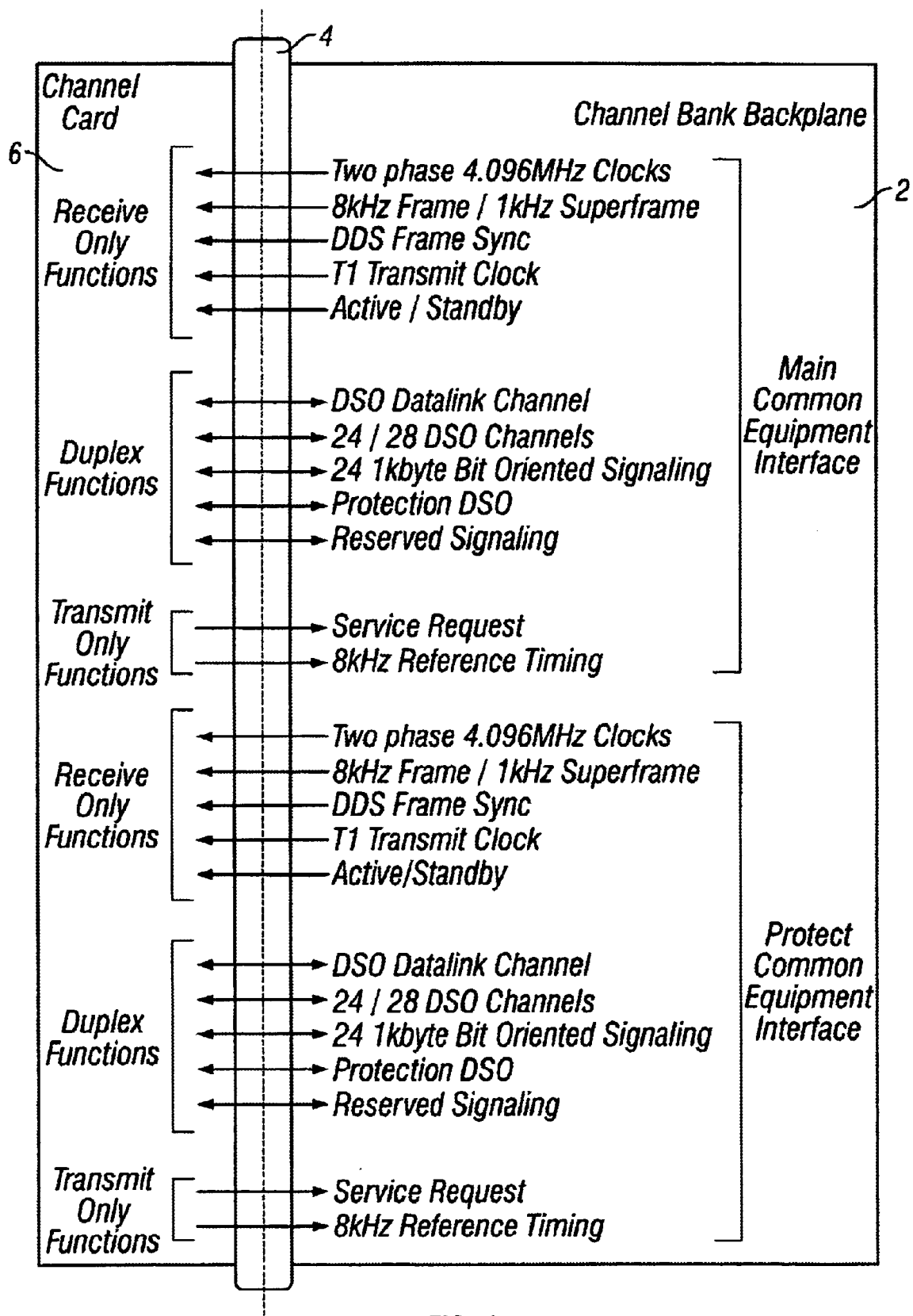
FIG. 1 shows a diagram of interface functions for an embodiment of the variable rate subscriber bus according to the present invention.

FIG. 1 shows a diagram of an embodiment of interface functions for a variable rate subscriber bus according to the present invention. Some of the interface functions have a one-to-one correspondence to physical signals transmitted along metallic line traces on a channel bank backplane 2, while other interface functions are achieved by time-division multiplexing of different physical signals into a time division multiplexed (TDM) signal which is transmitted over the same metallic line trace or the same set of metallic line traces on the channel bank backplane. In an embodiment, the variable rate subscriber bus 4 provides the interface functions as illustrated in FIG. 1 between the channel bank backplane 2 and a channel card 6.

The channel card 6 may be a conventional channel card operating at a basic data rate of 2.048 Mbps. Examples of channel cards operating at the data rate of 2.048 Mbps include conventional low-density quadruple or octal plain old telephone service (POTS) channel cards and single T1 channel cards. The channel card 6 may also be a high-density channel card such as a quadruple T1 channel card or an asynchronous transfer mode (ATM) optical line unit (AOLU) operating at a higher data rate. In an embodiment of the present invention, the variable rate subscriber bus 4 is capable of supporting communications with the channel card 6 at different data rates including the basic data rate of 2.048 Mbps for conventional low-density quadruple and octal POTS channel cards and single T1 channel cards, as well as a variety of higher-density channel cards including quadruple T1 channel cards and AOLUs which operate at data rates higher than 2.048 Mbps.

In the embodiment shown in FIG. 1, the variable rate subscriber bus 4 is shown as having two sets of interfaces including a main common equipment interface and a protect common equipment interface. In this embodiment, all of the interface functions of the variable rate subscriber bus 4 according to the present invention are duplicated as two physically identical sets of buses for fault protection. The interface functions of the protect common equipment interface are identical to the corresponding interface functions of the main common equipment interface. In an embodiment, only the main common equipment interface is operational during normal operations unless a fault is detected on the main common equipment interface. The protection common equipment interface, which is non-operational during normal operations, is activated only if there is a fault on the main common equipment interface.

In an embodiment, some of the interface functions as illustrated in FIG. 1 correspond respectively to separate physical signals while others are multiplexed together to form TDM signals. For example, the Digital Signal zero (DS0) channels, the DS0 data link channel and the signaling channel may be time-division multiplexed together to form a single TDM signal. The protection DS0 channel may also be time-division multiplexed with the DS0 channels in an embodiment. On the other hand, the 4.096 MHz clocks, the framing signals for the 8 KHz synchronous optical network (SONET) frame or the 1 KHz subscriber bus superframe, and the digital data service (DDS) frame synchronization signal are carried by separate physical channels on the variable rate subscriber bus 4 in an embodiment.

In FIG. 1, interface functions which allow communications between the channel bank backplane 2 and the channel card 6 in either the direction from the channel bank backplane to the channel card or vice versa are labeled as duplex functions. Interface functions which allow communications only in the direction from the channel bank backplane 2 to the channel card 6 are labeled as receive only functions. Interface functions which allow communications only in the direction from the channel card 6 to the channel bank backplane 2 are labeled as transmit only functions.

Figure 2A:
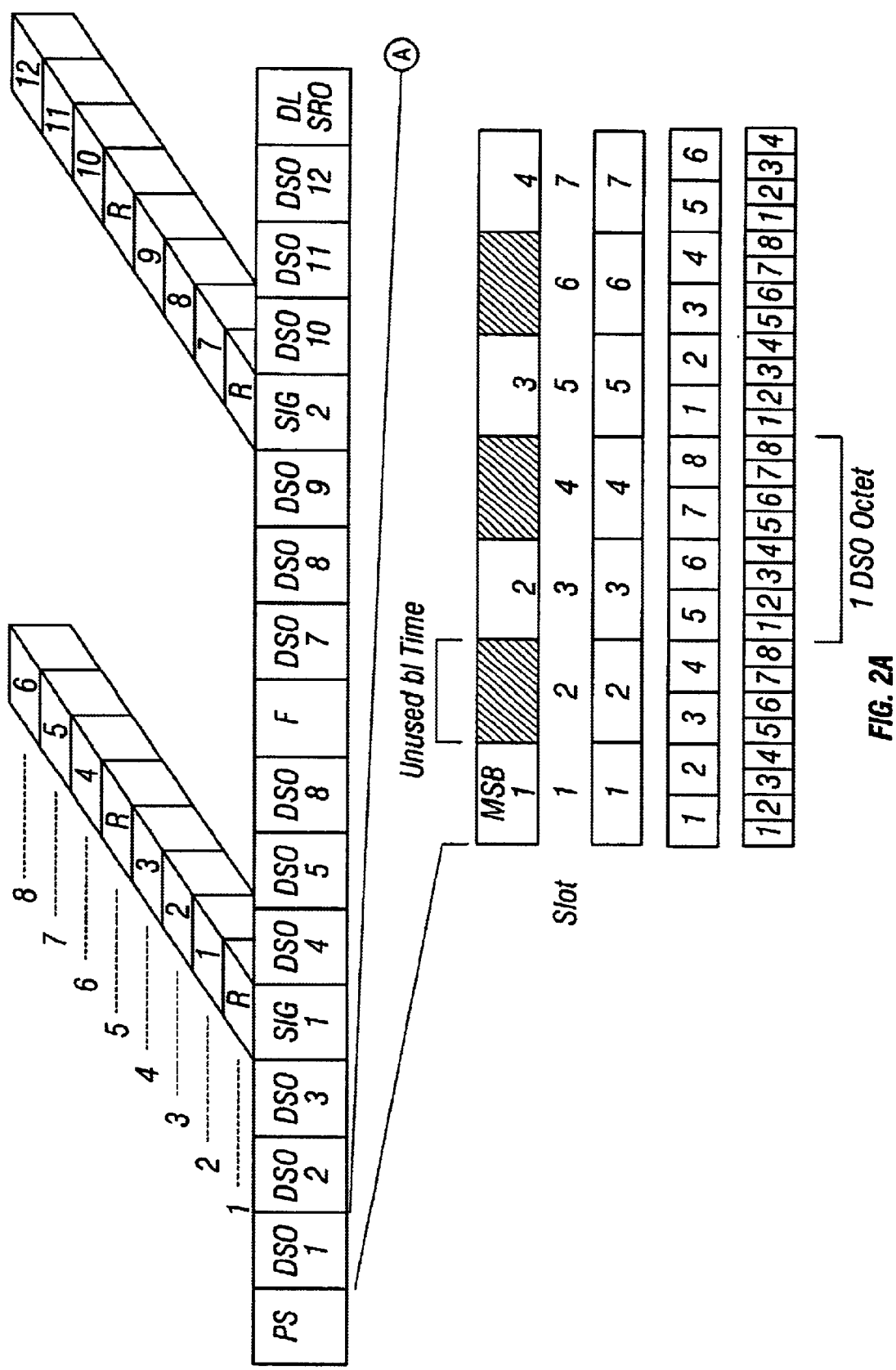
FIG. 2 shows an embodiment of a data format for DS0 cells in a SONET frame for transmission over a variable rate subscriber bus according to the present invention.
Figure 2B:
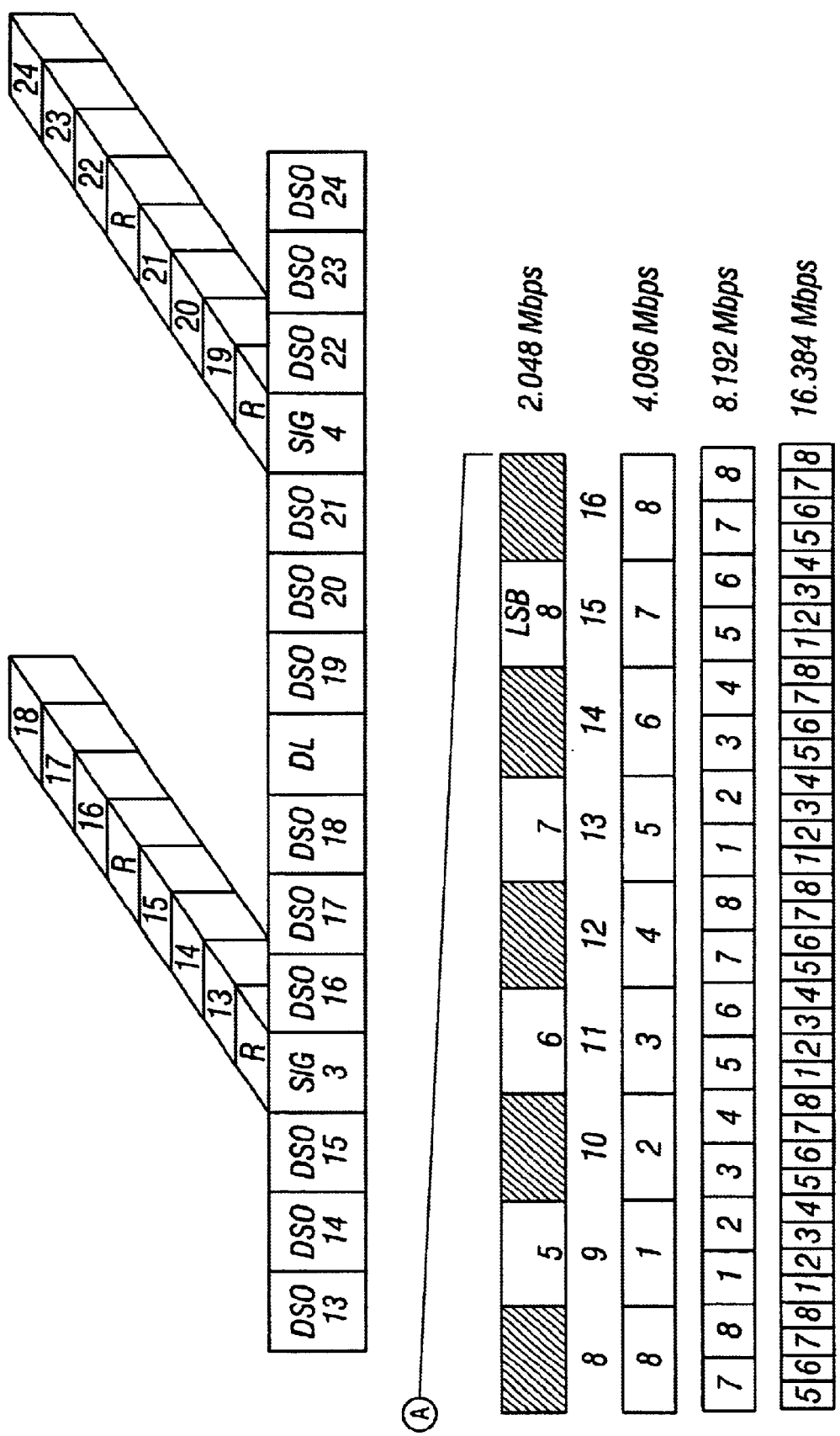

FIG. 2 shows an embodiment of a data format for a SONET frame carrying a plurality of DS0 cells with bit formats for the transmission of DS0 cells at four predetermined data rates of 2.048 Mbps, 4.096 Mbps; 8.192 Mbps and 16.384 Mbps. Although FIG. 2 shows the four data rates from which the data rate for the transmission of DS0 cells may be selected, other selectable data rates may also be provided for the variable rate subscriber bus within the scope of the present invention. In an embodiment, each of the higher data rates is an integral multiple of the basic data rate, which is the lowest data rate among the selectable data rates. In a further embodiment, the integral multiple for each of the higher data rates is an integral power of two. In the embodiment illustrated in FIG. 2, the higher data rates of 4.096 Mbps, 8.192 Mbps and 16.384 Mbps are 2, 4, and 8 times the basic data rate of 2.048 Mbps, respectively.

Figure 3:
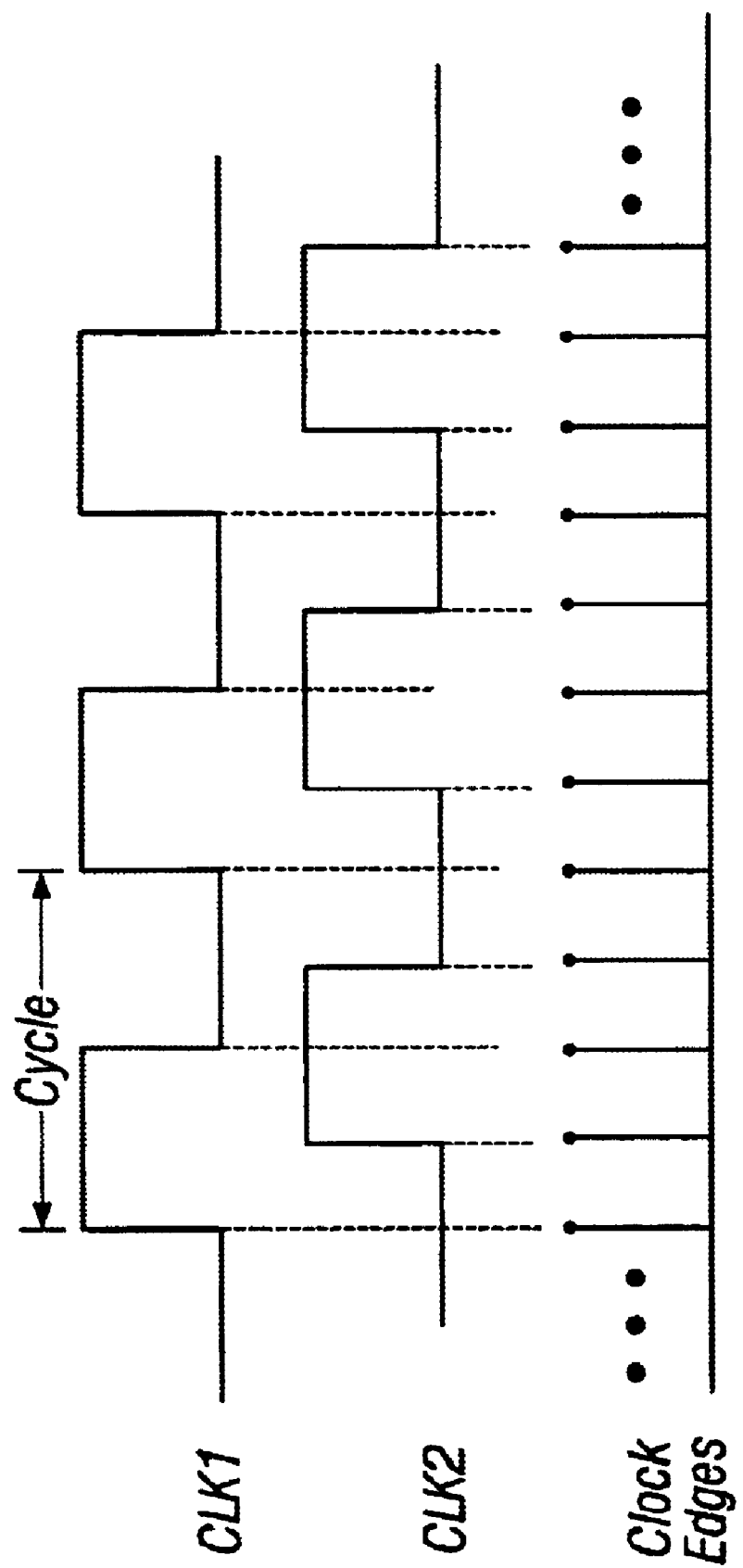
FIG. 3 shows an embodiment of timing provided by two fifty-percent duty cycle quadrature clocks for the variable rate subscriber bus according to the present invention.

In an embodiment, a clock frequency of 4.096 MHz is provided on the clock channel of the variable rate subscriber bus according to the present invention, regardless of which one of the four data rates as shown in FIG. 2 is selected for the transmission of the DS0 cells. In an embodiment as shown in FIG. 3, two phase-shifted 4.096 MHz clock signals labeled as CLK1 and CLK2 are provided as a timing reference for the DS0 cells transmitted over the variable rate subscriber bus. In an embodiment, the two clock signals are fifty-percent duty cycle quadrature clock signals each having a clock rate of 4.096 MHz. In this embodiment; one of the clock signals is phase shifted 90° with respect to the other clock signal.

The clock signals are tightly synchronous and provide the channel card with four equally spaced edges per cycle for the timing of the data bits within the DS0 cells. Because the two fifty-percent duty cycle quadrature clocks each having a clock frequency of 4.096 MHz provide four equally spaced edges per clock cycle, a timing resolution equivalent to a data rate of 16.384 Mbps can be derived from the two quadrature clock signals. These clock signals can be used by the channel card for timing the reception as well as the transmission of DS0 cells at any one of the four data rates as shown in FIG. 2. Therefore, the timing reference provided by the two quadrature clock signals as shown in FIG. 3 is applicable to the transfer of DS0 cells across the variable rate subscriber bus in both directions.

Referring to FIG. 2, a plurality of DS0 cells, signaling cells (SIG), a framing cell (F), a data link service request cell (DL SRQ) and a data link cell (DL) are time-division multiplexed within a SONET frame. A standard SONET frame has a duration of 125 μs which is equivalent to a frame rate of 8 KHz. In an embodiment, the 8 KHz SONET frame is used for synchronization of the DS0 cells which are transferred over the variable rate subscriber bus in either direction. Frame synchronization of DS0 cells using a standard SONET frame can be achieved in a conventional manner known to a person skilled in the art.

In another embodiment, a subscriber bus superframe having a duration of 1 ms is used for synchronizing the DS0 cells which are transferred over the variable rate subscriber bus in either direction. The subscriber bus superframe, which has a frame rate of 1 KHz, has a frame length equal to 8 standard SONET frames. In an embodiment, both the subscriber bus superframe having a frame rate of 1 KHz and the standard SONET frame having a frame rate of 8 KHz are provided for synchronizing the DS0 cells in both transmit and receive directions.

In an embodiment, a frame synchronization channel is provided on the variable rate subscriber bus according to the present invention for transferring timing pulses defining a SONET frame to synchronize the DS0 cells. In a further embodiment, a superframe synchronization channel is also provided on the variable rate subscriber bus according to the present invention for transferring timing pulses defining a subscriber bus superframe to synchronize the DS0 cells. These timing pulses are used to define the frame boundaries of the cell slots including the cell slots assigned to carry the DS0 cells at any one of the data rates selected for transmission over the variable rate subscriber bus according to the present invention.

FIG. 2 shows an embodiment in which the SONET frame is divided into 32 cell slots including 24 cell slots assigned to carry the DS0 cells. In this embodiment, the first cell slot, which is labeled as PS in FIG. 2, is either a "protect state" time slot if T1 cells are carried within the SONET frame or simply a reserved time slot if standard DS0 cells are carried within the SONET frame. A first set of three DS0 cells labeled as DS0 cell numbers 1–3 are assigned to the three cell slots immediately following the first cell slot labeled PS. A first signaling cell labeled as SIG1 is assigned to the cell slot immediately following the first set of three DS0 cells, and a second set of three DS0 cells labeled as DS0 cell numbers 4–6 are assigned to the three cell slots immediately following the first signaling cell SIG1.

Furthermore, a framing cell labeled as F in FIG. 2 is assigned to the cell slot immediately following the second set of three DS0 cells 4–6. A third set of DS0 cells labeled as DS0 cell numbers 7–9 are assigned to the three cell slots immediately following the framing cell F. A second signaling cell labeled as SIG2 is assigned to the cell slot immediately following the third set of DS0 cells 7–9. A fourth set of DS0 cells labeled as DS0 cell numbers 10–12 are assigned to the three cell slots immediately following the second signaling cell SIG2. A data link service request cell labeled as DL SRQ is assigned to the cell slot immediately following the fourth set of DS0 cells 10–12.

A fifth set of three DS0 cells labeled as DS0 cell numbers 13–15 are assigned to the three cell slots immediately following the data link service request cell DL SRQ. A third signaling cell labeled as SIG3 is assigned to the cell slot immediately following the fifth set of DS0 cells, and a sixth set of three DS0 cells labeled as DS0 cell numbers 16–18 are assigned to the three cell slots immediately following the third signaling cell SIG3. A data link cell labeled as DL is assigned to the cell slot immediately following the sixth set of DS0 cells 16–18. A seventh set of DS0 cells labeled as DS0 cell numbers 19–21 are assigned to the three cell slots immediately following the data link cell DL.

A fourth signaling cell labeled as SIG4 is assigned to the cell slot immediately following the seventh set of DS0 cells 19–21, and an eighth set of three DS0 cells labeled as DS0 cell numbers 22–24 are assigned to the last three cell slots immediately following the fourth signaling cell SIG 4. In this embodiment, the SONET frame carries 24 DS0 cells, four signaling cells SIG1–4, a protect state cell PS, a framing cell F, a data link service request cell DL SRQ and a data link cell DL. Embodiments of the signaling cells, the framing cell, the data link cell and the data link service request cell will be described in detail below.

FIG. 2 shows an embodiment in which four predetermined data rates of 2.048 Mbps, 4.096 Mbps, 8.192 Mbps and 16.384 Mbps are provided for the transmission of DS0 cells over the variable rate subscriber bus according to the present invention. In an embodiment, when the DS0 cells are transmitted at the basic data rate of 2.048 Mbps, which is the default data rate for compatibility with conventional low-density channel cards such as quadruple or octal POTS channel cards or single T1 channel cards, only 8 bits of data are carried within each DS0 cell.

In an embodiment, each DS0 cell is divided into sixteen time slots consisting of 8 odd time slots and 8 even time slots interleaved with each other. The sixteen time slots are numbered 1–16 consecutively for the purpose of description of FIG. 2. In an embodiment, the eight data bits are assigned only to the odd time slots in the DS0 cell if the data rate is set at 2.048 Mbps. The even time slots within the DS0 cell are unused time slots in this embodiment. Although the assignment of bit time slots for the basic data rate of 2.048 Mbps as shown in FIG. 2 is an embodiment which is compatible with conventional low-density channel cards, another data format for the assignment of data bits to the DS0 cell for the data rate of 2.048 Mbps can also be used within the scope of the present invention if the channel card to which the variable rate subscriber bus is connected is compatible with that data format.

When the DS0 cells are transferred over the variable rate subscriber bus according to the present invention at a data rate of 4.096 Mbps, each of the DS0 cells is divided into sixteen time slots. In this embodiment, two data bytes each consisting of eight data bits are assigned to each of the DS0 cells. In an embodiment, a first data byte is assigned to the first half of the sixteen time slots and a second data byte is assigned to the second half of the sixteen time slots subsequent in sequence to the first half. In this embodiment, the two data bytes are not bit-interleaved with each other within the DS0 cell. In an alternate embodiment, the data bits of the two data bytes may be bit-interleaved with each other within the DS0 cell if the channel card to which the variable rate subscriber bus is connected is designed to read the data in a bit-interleaved format.

When the DS0 cells are transferred over the variable rate subscriber bus according to the present invention at a data rate of 8.192 Mbps, thirty-two time slots are provided within each of the DS0 cells. In an embodiment, the four data bytes are byte-interleaved with each other within the DS0 cell. Each data byte within the DS0 cell is also called a DS0 octet. Although the four data bytes in the DS0 cell as shown in FIG. 2 are not bit-interleaved with each other when the DS0 cells are transferred at a data rate of 8.192 Mbps over the variable rate subscriber bus, the data bytes may be bit-interleaved with each other within each of the DS0 cells in an alternate embodiment if the channel card to which the variable rate subscriber bus is connected is designed to read the data bytes in a bit-interleaved format.

When the DS0 cells are transferred over the variable rate subscriber bus according to the present invention at a data rate of 16.384 Mbps, sixty-four time slots are provided within each of the DS0 cells. Eight data bytes each consisting of eight data bits are assigned to each of the DS0 cells. In an embodiment, the eight data bytes are byte-interleaved with each other within each of the DS0 cells. Each data byte is also called a DS0 octet. In the embodiment shown in FIG. 2, the eight data bytes within the DS0 cell which is transferred over the subscriber bus at the data rate of 16.384 Mbps are not bit-interleaved with each other. In an alternate embodiment, the data bytes may be bit-interleaved with each other if the channel card to which the variable rate subscriber bus is connected is designed to read the data bytes in a bit-interleaved format.

When two quadrature clock signals each having a clock frequency of 4.096 MHz and a duty cycle of fifty percent are provided with a phase shift of 90° with respect to each other, four equally spaced edges are provided within each clock cycle as shown in FIG. 3. A maximum data rate of 16.384 Mbps can thus be achieved by transmitting data bits using a timing reference derived from the edges of the clock signals. When the data rate is set at 8.192 Mbps, two equally spaced clock edges per cycle are used for providing a timing reference for the data bits. At a data rate of 4.096 Mbps, only one data bit per clock cycle is transferred over the variable rate subscriber bus.

At the basic data rate of 2.048 Mbps, a bit rate of 4.096 Mbps is derived from the clocks at a rate of one bit per clock cycle. However, the data bits are carried only within. the odd or the even bit time slots of each DS0 cell, thereby producing an effective data rate of 2.048 Mbps. In an embodiment, the two quadrature clock signals as shown in FIG. 3 are tightly synchronous digital clock signals with a substantially rectangular waveform. In practice, the clock signals may be substantially trapezoidal waveforms with tightly specified rise and fall times for the rising and falling edges.

In an embodiment, the DS0 cells as illustrated in FIG. 2 may carry T1 data instead of DS0 data. A T1 cell is a concatenated DS0 cell and therefore can be carried within the cell slots for the DS0 cells as shown in FIG. 2. In an embodiment, the first cell slot, which is labeled as PS in FIG. 2, is a protect state time slot for carrying a T1 protect state cell if T1 cells are carried within the cell slots labeled as DS0 cell slots 1–24 in FIG. 2. On the other hand, if the cell slots labeled as DS0 cell slots in FIG. 2 carry standard DS0 cells, the first cell slot labeled as PS is simply a reserved cell slot.

FIG. 2 also shows an embodiment of signaling bits for the signaling cells SIG1, SIG2, SIG3 and SIG4 when the DS0 cell slots carry standard DS0 cells instead of T1 cells. In this embodiment, bits 1 and 5 of each of the signaling cells are reserved bits. Within the first signaling cell SIG1, bits 2–4 are the signaling bits for DS0 cells 1–3, respectively, while bits 6–8 are the signaling bits for DS0 cells 4–6, respectively. Similarly, bits 2–4 of the second signaling cell SIG2 are the signaling bits for DS0 cells 7–9, while bits 6–8 of the second signaling cell SIG2 are the signaling bits for DS0 cells 10–12. Within the third signaling cell SIG3, bits 2–4 are the signaling bits for DS0 cells 13–15 while bits 6–8 are the signaling bits for DS0 cells 16–18. Within the fourth signaling cell SIG4, bits 2–4 are the signaling bits for DS0 cells 19–21 while bits 6–8 are the signaling bits for DS0 cells 22–24. Each of the signaling cells thus carries the signaling bits for three DS0 cells immediately preceding the signaling cell and for three DS0 cells immediately following the signaling cell.

Figure 4A:
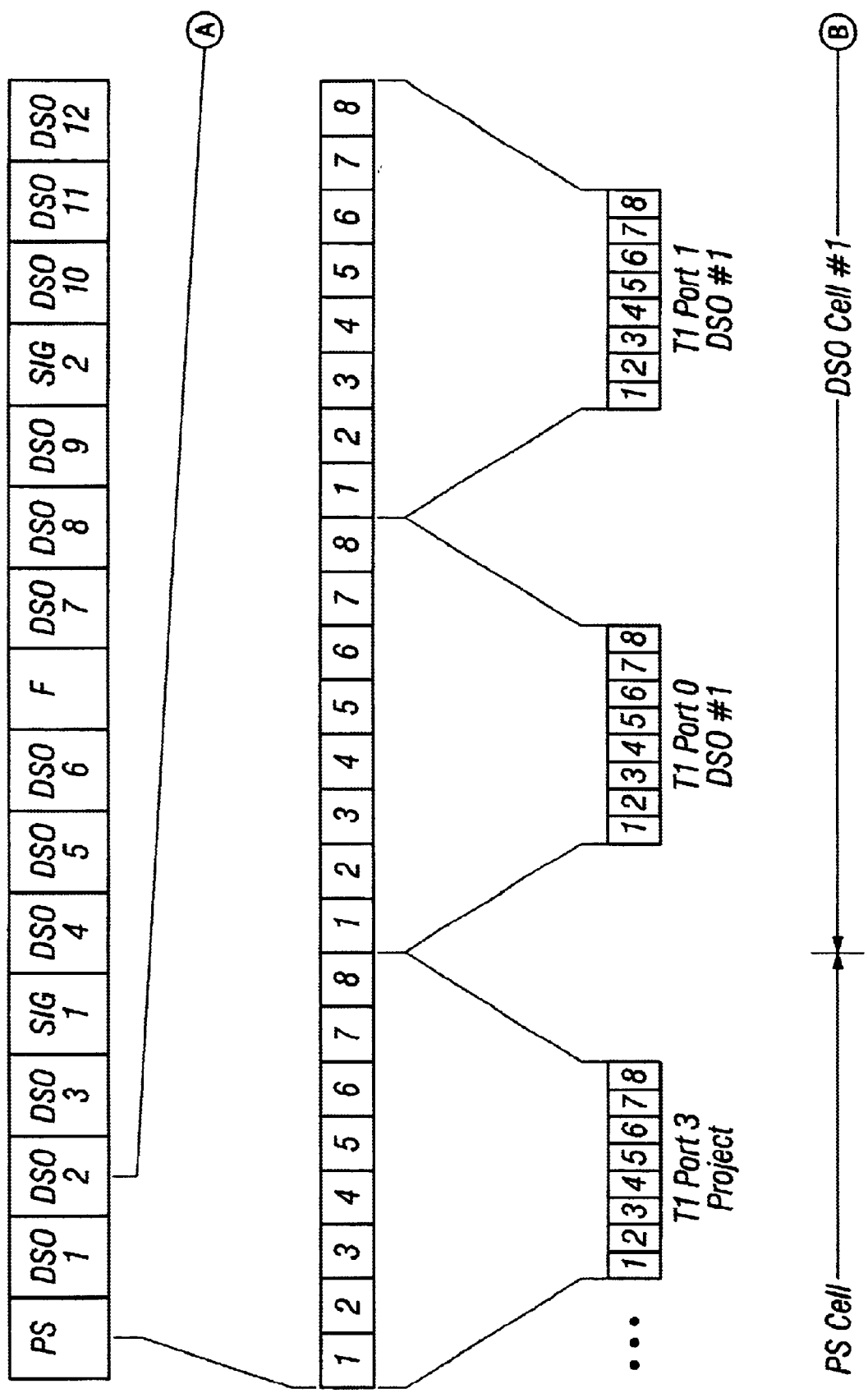
FIG. 4 shows an embodiment of a data format for the assignment of T1 data bytes in an embodiment in wich the variable rate subscriber bus according to the present invention supports four T1 channels for transporting T1 traffic through four T1 ports.
Figure 4B:
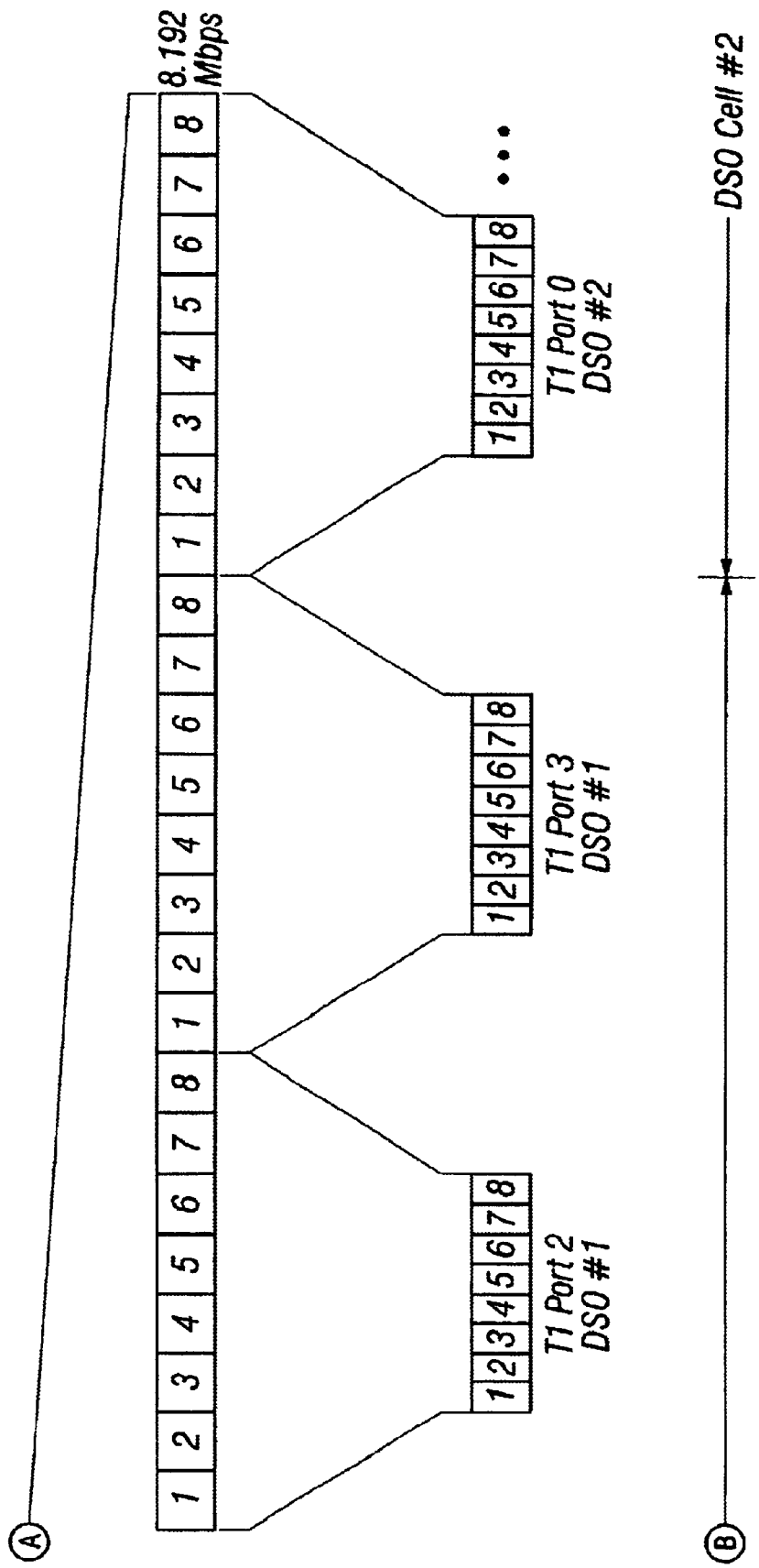

FIG. 4 shows a data format in an embodiment in which the variable rate subscriber bus according to the present invention is capable of supporting four T1 channels for transporting T1 traffic through four T1 ports labeled consecutively as T1 Ports 0–3. In this embodiment, the data rate for the T1 cells is 8.192 Mbps. In an embodiment, a high-density channel card, such as a quadruple T1 channel card, is capable of transferring T1 data over four T1 channels to four separate T1 ports. Thirty-two bit time slots are provided within each of the cell slots labeled as DS0 cells in the SONET frame. In this embodiment, four DS0 octets are assigned to the first DS0 cell slot DS0#1.

Each of the DS0 octets carries a data byte consisting of eight data bits destined for a respective one of the four T1 ports. In an embodiment, the DS0 octet for T1 Port 0 is assigned to the first eight-bit time slot of the first DS0 cell. The DS0 octet carrying the data bits for T1 Port 1 is assigned to the second eight-bit time slot of the first DS0 cell. In a similar manner, the DS0 octets for T1 Ports 2 and 3 are assigned to the third and fourth eight-bit time slots of the first DS0 cell, respectively. The same assignment of DS0 octets for the four T1 ports is also applicable to the other DS0 cell slots within the SONET frame. For example, within the second DS0 cell slot DS0#2, the DS0 octet for T1 Port 0 is assigned to the first eight-bit time slots, followed by another DS0 octet for T1 Port 1 and so on.

In an embodiment, the protect state time slot PS is used by the quadruple T1 channel cards when they are configured as TR-008 4+1 protect groups, which are standard fault protection mechanisms known to a person skilled in the art. In the event of a transmit failure, the protect state time slot is activated. In an embodiment, thirty-two bit time slots are provided within the protect state cell slot PS. In an embodiment, the last eight-bit time slots of the protect state cell slot PS are assigned to carry protect state bits for T1 Port 3 as shown in FIG. 4. Furthermore, the eight-bit time slots preceding the bit time slots for T1 Port 3 are assigned to carry the protect state bits for T1 Port 2.

In an embodiment, the assignment of bit time slots within the protect state cell slot PS follows the same sequence as for the assignment of DS0 octets for the T1 ports within each of the DS0 cell slots. When the T1 cells are transferred at a data rate of 8.192 Mbps between the variable rate subscriber bus and a quadruple T1 channel card, for example, the protect state cell slot PS reports the protect status of each of the four T1 ports. Although the embodiment as illustrated in FIG. 4 shows the assignment of the bit time slots for carrying the DS0 octets for T1 Ports 0–3 in sequence within each of the DS0 cell slots, another scheme of bit time slot assignment for the DS0 octets with a different octet sequence may also be used within the scope of the present invention if the quadruple T1 channel card is designed to read the data bits in that sequence.

Figure 5:
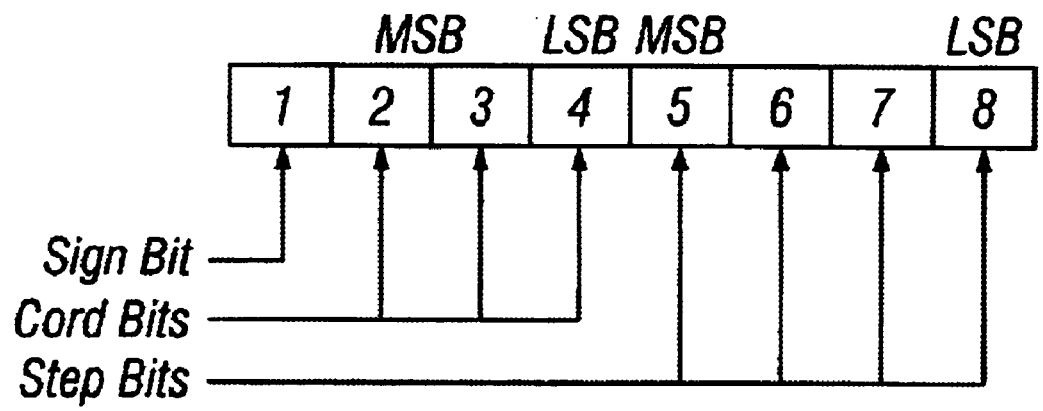
FIG. 5 shows an embodiment of a pulse code modulation (PCM) bit format for one of the DS0 cells in the embodiment of the data format shown in FIG. 2 for the variable rate subscriber bus according to the present invention.

FIG. 5 shows an embodiment of a pulse code modulated (PCM) data bit format for each of the DS0 cells transferred over the variable rate subscriber bus according to the present invention. In the embodiment shown in FIG. 5, a DS0 octet consists of eight bits numbered consecutively from bit 1 to bit 8. Bit 1 of the DS0 octet is transmitted first and bit 8 is transmitted last over the variable rate subscriber bus. In an embodiment, bit 1 is the sign bit for the data carried within the DS0 octet. Bits 2–4 are allocated as cord bits according to the PCM format as shown in FIG. 5, with bit 2 being the most significant bit (MSB) and bit 4 being the least significant bit (LSB) among the cord bits. Bits 5–8 are allocated as step bits according to the PCM format as shown in FIG. 5, with bit 5 being the most significant bit (MSB) and bit 8 being the least significant bit (LSB) among the step bits. In an embodiment, a conventional inverted u-law encoding scheme is applied to a telephony signal to generate the sign bit, the cord bits and the step bits using a standard PCM format which is known to a person skilled in the art. For example, a binary number 0 assigned to the sign bit may represent a positive amplitude signal whereas a binary number 1 assigned to the sign bit may represent a negative amplitude signal.

In an embodiment, when bits 2–8 of the DS0 octet carry binary zeroes, a zero amplitude signal is represented by the DS0 octet. A full-scale amplitude signal is represented by a DS0 octet with all of the cord bits and all of the step bits carrying binary number 1. For example, a DS0 octet carrying binary numbers 01111111 represents a positive full-scale amplitude whereas a DS0 octet carrying binary numbers 1111111 represents a negative full-scale amplitude. Other PCM formats for digitizing telephony signals can also be used in a different embodiment to generate DS0 octets which are carried within the DS0 cells for transmission over a variable rate subscriber bus within the scope of the present invention.

In the embodiment shown in FIG. 2 and described above, the variable rate subscriber bus according to the present invention provides multiples of twenty-four standard DS0 channels each having a data rate of 64 Kbps, to a maximum of 192 DS0 channels distributed across a standard SONET frame having a duration of 125 µs. When the DS0 cells are transferred over the variable rate subscriber bus at a basic data rate of 2.048 Mbps, each of the DS0 cell slots carries only one DS0 octet. Each of the DS0 octets consists of eight data bits for a corresponding one of the 24 DS0 channels. When the data rate is set at 4.096 Mbps, each of the twenty-four DS0 cell slots carries two DS0 octets each consisting of eight data bits for a respective DS0 channel, thereby achieving a transport capacity of 48 DS0 channels. The transport capacity of the variable rate subscriber bus is 96 DS0 channels when the data rate is set at 8.192 Mbps. At a data rate of 16.384 Mbps, the total transport capacity of the variable rate subscriber bus is 192 DS0 channels.

In an embodiment, the DS0 cell slots as shown in FIG. 2 may also be used to carry one or more Digital Signal 1 (DS1) channels. A standard DS1 channel has a data rate of 1.544 Mbps. A DS1 channel is thus equivalent to a set of 24 DS0 channels in terms of transport capacity. In the embodiment shown in FIG. 2, a SONET frame is capable of carrying a single DS1 channel within the twenty-four DS0 cell slots when the data bits are transferred over the variable rate subscriber bus at the basic data rate of 2.048 Mbps. Two DS1 channels can be provided within a SONET frame when the data rate over the variable rate subscriber bus is 4.096 Mbps.

When the data rate over the variable rate subscriber bus is 8.192 Mbps, four DS1 channels can be provided within a SONET frame. When the data rate over the variable rate subscriber bus is 16.384 Mbps, the transport capacity of the variable rate subscriber bus is eight DS1 channels.

Figure 6:
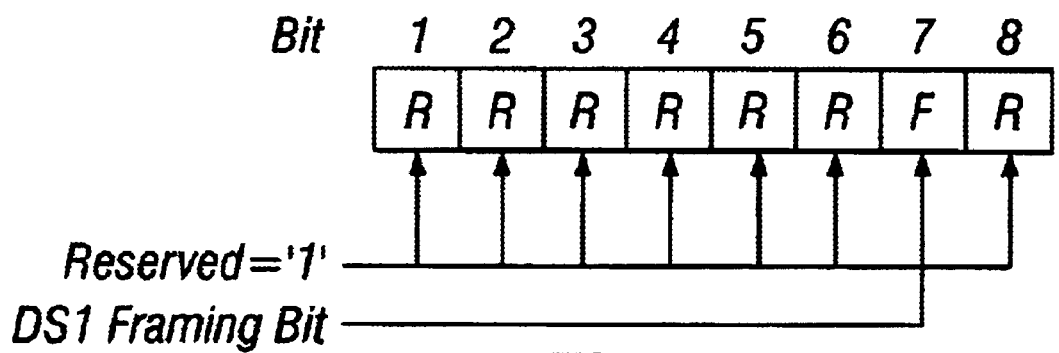
FIG. 6 shows an embodiment of a DS1 framing bit format for the framing byte as shown in the data format of FIG. 2.

FIG. 6 shows an embodiment of a bit format for the framing cell when one or more DS1 channels are transported over the variable rate subscriber bus according to the present invention. In FIG. 2, the framing cell, which is denoted as cell F, is positioned between DS0 cell number 6 and DS0 cell number 7. Referring to FIG. 6, the framing cell consists of eight bits, seven of which are reserved bits and one of which is a DS1 framing bit. In an embodiment, the DS1 framing bit is bit 7 which is the second to the least significant bit of the framing cell. In this embodiment, the DS1 framing bit is compatible with the SONET byte synchronous Virtual Tributary (VT) 1.5 format which is known to a person skilled in the art. The DS1 framing bit in the framing cell is used only for applications in which one or more DS1 channels are provided across the variable rate subscriber bus according to the present invention. The cell slot F assigned to carry the framing cell for the purpose of carrying the DS1 framing bit in DS1 applications may be used for any other purpose in non-DS1 applications, such as in DS0 applications.

Figure 7:
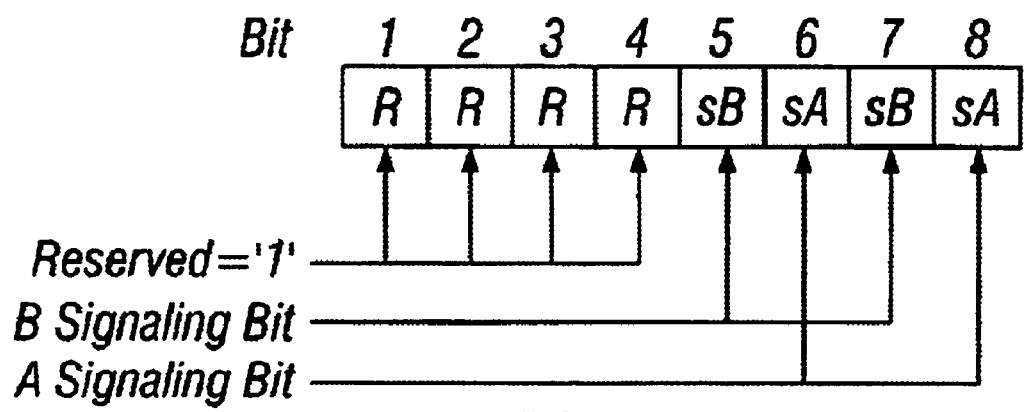
FIG. 7 shows an embodiment of a four-state T1 signaling format for the signaling cell as shown the data format of in FIG. 2.

When telecommunications data are transported over the variable rate subscriber bus in the T1 format, either a four-state signaling mode, also called an AB signaling mode, or a sixteen-state signaling mode, also called an ABCD signaling mode, may be used. Both the AB signaling mode and the ABCD signaling mode are known to a person skilled in the art. FIG. 7 shows an embodiment of a four-state signaling format for any given one of the signaling cells labeled as SIG1, SIG2, SIG3 and SIG4 as shown in FIG. 2 when used on T1 systems. In FIG. 7, the first four bits of the signaling cell are reserved bits. The reserved bits may each carry a binary number 1 in an embodiment.

FIG. 7 is applicable to an embodiment in which a four-state AB signaling format is used for the T1 cells. In an embodiment, bits 5 and 6 are assigned a B signaling bit and an A signaling bit denoted as sB and sA, respectively. In the embodiment shown in FIG. 7, bits 7 and 8 are also allocated for carrying the signaling bits sB and sA, respectively. Bits 7 and 8 are thus repetitive of bits 5 and 6 in the four-state AB signaling mode.

Figure 8:
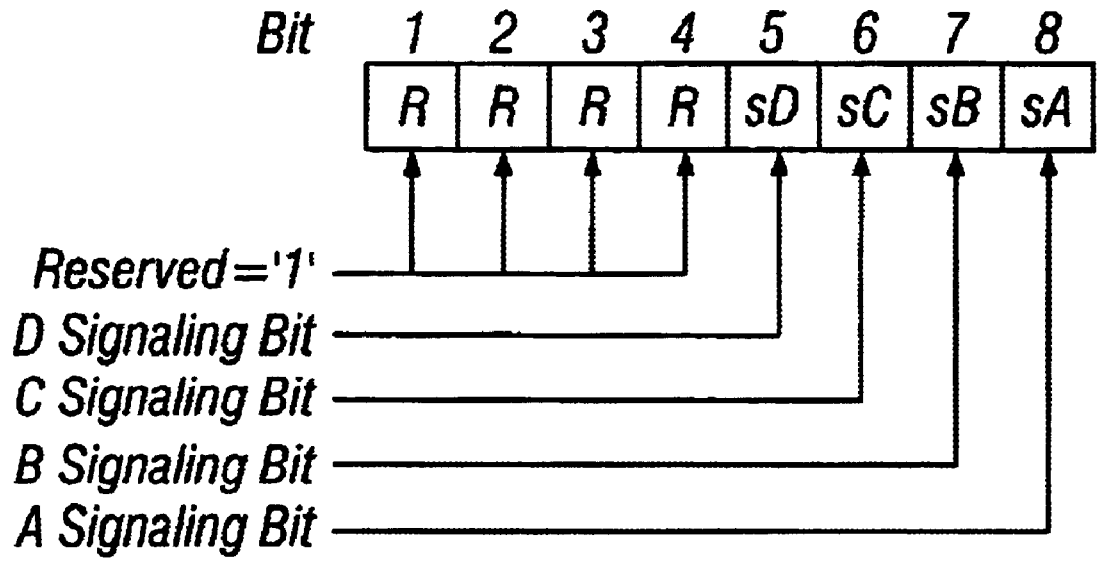
FIG. 8 shows an embodiment of a sixteen-state T1 signaling format for the signaling cell as shown in the data format of FIG. 2.

FIG. 8 shows an embodiment of a sixteen-state signaling format for any given one of the signaling cells denoted as SIG1, SIG2, SIG3 and SIG4 as shown in FIG. 2. Referring to FIG. 8, the first four bits of the signaling cell are reserved bits, each of which is assigned a binary number 1 in an embodiment. When the T1 cells use the sixteen-state ABCD signaling mode, a D signaling bit, denoted as sD, is assigned to bit 5 of the signaling cell. C, B and A signaling bits, which are denoted as sC, sB, and sA, respectively, are assigned to bits 6–8 of the signaling cell. The signaling formats for signaling cells in the standard AB and ABCD signaling modes as shown in FIGS. 7 and 8 are used for compatibility with conventional T1 systems. Other signaling formats can also be used depending upon different applications within the scope of the present invention.

Figure 9:
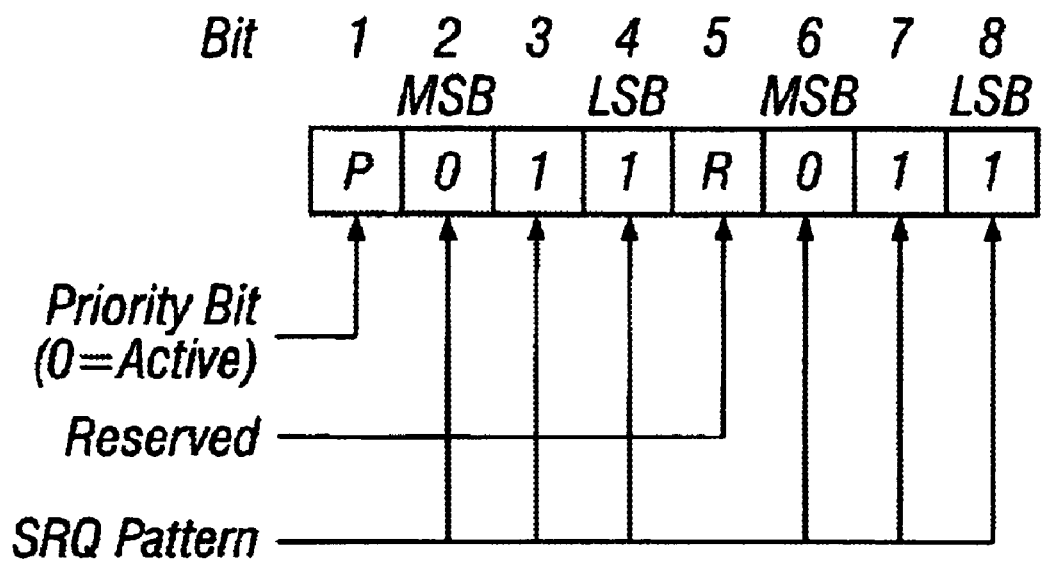
FIG. 9 shows an embodiment of a service request format for the data link service request cell as shown in the data format of FIG. 2.

FIG. 9 shows an embodiment of a service request format for the data link service request cell, which is denoted as DL SRQ in FIG. 2. Referring to FIG. 9, the first bit of the data link service request cell is allocated as a priority bit. In an embodiment, the data link service request is active when the priority bit carries a binary number 0. The fifth bit of the data link service request cell is a reserved bit. A three-bit service request (SRQ pattern) is repeated for bits 2–4 and bits 6–8 of the data link service request cell. The most significant bit (MSB) of the SRQ pattern is assigned to bits 2 and 6 of the service request cell. The middle bit of the SRQ pattern is assigned to bits 3 and 7 of the data link service request cell. The least significant bit (LSB) of the SRQ pattern is assigned to bits 4 and 8 of the data link service request cell.

In an embodiment, a channel card always transmits an all-zero SRQ pattern when it is not requesting data link service. In an embodiment, the data link service request cell is used to communicate between a channel card and the node control processor of a channel bank to select the data rate over the variable rate subscriber bus. In an embodiment, the channel card initially communicates with the node control processor over the variable rate subscriber bus at the basic data rate of 2.048 Mbps.

In an embodiment, after the node control processor receives the identity of the channel card by reading the SRQ pattern which is carried within the data link service request cell DL SRQ transmitted over the variable rate subscriber bus at the basic data rate of 2.048 Mbps, the node control processor commands the channel card to select one of the higher data rates of 4.096 Mbps, 8.192 Mbps, and 16.384 Mbps depending upon the transport capacity of the channel card. The channel card then selects the new data rate and acknowledges receipt of the command at the higher data rate.

In this embodiment, the SRQ pattern in the data link service request cell is used for communications between the channel card and the node control processor of the channel bank for selecting the data rate. Other schemes for selecting the data rate can also be used within the scope of the present invention. For example, communications between the node control processor and the channel card can be provided over a data link channel allocated to the cell slot denoted as DL in FIG. 2. Various types of message formats can be used for communications in both directions through the data link channel in a conventional manner apparent to a person skilled in the art.

The present invention has been described with respect to particular embodiments thereof, and numerous modifications can be made which are within the scope of the claims.

What is claimed is:

1. A method of data transmission over a variable rate subscriber bus, the method comprising the steps of:
   (a) providing a Digital Signal 0 (DS0) cell;
   (b) providing a clock signal at a predetermined clock frequency;
   (c) providing a plurality of predetermined data rates for the subscriber bus, the predetermined data rates including a basic data rate and at least one higher data rate;
   (d) selecting one of the predetermined data rates as a selected data rate for transmitting the data; and
   (e) assigning a plurality of data bits to the DS0 cell in dependence upon the selected data rate.

2. The method of claim 1, further comprising the step of providing a synchronous optical network (SONET) frame for synchronizing the DS0 cell.

3. The method of claim 2, further comprising the step of synchronizing a plurality of DS0 cells at a frame rate of 8 KHz based upon the SONET frame which has a duration of 125 µs.

4. The method of claim 1, further comprising the step of providing a synchronous optical network (SONET) superframe for synchronizing the DS0 cell.

5. The method of claim 4, further comprising the step of synchronizing a plurality of DS0 cells at a frame rate of 1 KHz based upon the subscriber bus superframe which has a duration of 1 ms.

6. The method of claim 1, wherein the predetermined clock frequency is 4.096 MHz.

7. The method of claim 1, wherein the basic data rate is 2.048 megabits per second (Mbps).

8. The method of claim 7, wherein the higher data rate is a multiple of the basic data rate, the multiple being an integral power of 2.

9. The method of claim 8, wherein the predetermined data rates comprise a plurality of higher data rates of 4.096 Mbps, 8.192 Mbps and 16.384 Mbps.

10. The method of claim 9, further comprising the step of providing eight odd time slots and eight even time slots within the DS0 cell, the odd and even time slots interleaved with each other.

11. The method of claim 10, further comprising the steps of:
   assigning a data byte consisting of eight data bits only to the odd time slots; and
   transmitting the DS0 cell at the basic data rate of 2.048 Mbps.

12. The method of claim 9, further comprising the step of providing sixteen time slots within the DS0 cell.

13. The method of claim 12, further comprising the steps of:
   assigning two data bytes each consisting of eight data bits to the DS0 cell; and
   transmitting the DS0 cell at the data rate of 4.096 Mbps.

14. The method of claim 13, wherein the step of assigning the two data bytes to the DS0 cell comprises the steps of assigning a first one of the data bytes to a first half of the sixteen time slots and assigning a second one of the data bytes to a second half of the sixteen time slots subsequent in sequence to the first half.

15. The method of claim 9, further comprising the step of providing thirty-two time slots within the DS0 cell.

16. The method of claim 15, further comprising the steps of:
   assigning four data bytes each consisting of eight data bits to the DS0 cell; and
   transmitting the DS0 cell at the data rate of 8.192 Mbps.

17. The method of claim 16, wherein the step of assigning the four data bytes to the DS0 cell comprises the step of byte-interleaving the four data bytes.

18. The method of claim 9, further comprising the step of providing sixty-four time slots within the DS0 cell.

19. The method of claim 18, further comprising the steps of:
   assigning eight data bytes each consisting of eight data bits to the DS0 cell; and
   transmitting the DS0 cell at the data rate of 16.384 Mbps.

20. The method of claim 19, wherein the step of assigning the eight data bytes to the DS0 cell comprises the step of byte-interleaving the eight data bytes.

21. The method of claim 1, further comprising the steps of:
   providing a SONET frame;
   dividing the SONET frame into a plurality of cell slots comprising a first cell slot and a plurality of subsequent cell slots in temporal sequence; and
   assigning a first set of three DS0 cells to three of the cell slots immediately following the first cell slot.

22. The method of claim 21, further comprising the steps of:
  assigning a signaling cell to a fifth one of the cell slots immediately following the first set of three DS0 cells; and
  assigning a second set of three DS0 cells to three of the cell slots immediately following the signaling cell.

23. The method of claim 22, further comprising the step of assigning a framing cell to a ninth one of the cell slots immediately following the second set of three DS0 cells.

24. The method of claim 21, wherein the first cell slot comprises a reserved slot.

25. The method of claim 21, wherein the variable rate subscriber bus is capable of supporting a plurality of T1 channels, and wherein the first cell slot comprises a protect state slot.

26. The method of claim 1, wherein the variable rate subscriber bus is capable of transporting data over a plurality of DS1 channels.

27. A method of data transmission over a variable rate subscriber bus which is capable of supporting at least one T1 channel, the method comprising the steps of:
  (a) providing a T1 cell;
  (b) providing a clock signal at a predetermined clock frequency;
  (c) providing a plurality of predetermined data rates for the subscriber bus, the predetermined data rates including a basic data rate and at least one higher data rate;
  (d) selecting one of the predetermined data rates as a selected data rate for transmitting the data; and
  (e) assigning a plurality of data bits to the T1 cell in dependence upon the selected data rate.

28. The method of claim 27, further comprising the step of providing a synchronous optical network (SONET) frame for synchronizing the T1 cell.

29. The method of claim 28, further comprising the step of synchronizing a plurality of T1 cells at a frame rate of 8 KHz based upon the SONET frame which has a duration of 125 $\mu$s.

30. The method of claim 27, further comprising the step of providing a synchronous optical network (SONET) superframe for synchronizing the T1 cell.

31. The method of claim 30, further comprising the step of synchronizing a plurality of T1 cells at a frame rate of 1 KHz based upon the subscriber bus superframe which has a duration of 1 ms.

32. The method of claim 27, wherein the predetermined clock frequency is 4.096 MHz.

33. The method of claim 27, wherein the basic data rate is 2.048 megabits per second (Mbps).

34. The method of claim 33, wherein the higher data rate is a multiple of the basic data rate, the multiple being an integral power of 2.

35. The method of claim 34, wherein the predetermined data rates comprise a plurality of higher data rates of 4.096 Mbps, 8.192 Mbps and 16.384 Mbps.

36. The method of claim 35, further comprising the step of providing eight odd time slots and eight even time slots within the T1 cell, the odd and even time slots interleaved with each other.

37. The method of claim 36, further comprising the steps of:
  assigning a data byte consisting of eight data bits only to the odd time slots; and
  transmitting the T1 cell at the basic data rate of 2.048 Mbps.

38. The method of claim 35, further comprising the step of providing sixteen time slots within the T1 cell.

39. The method of claim 38, further comprising the steps of:
  assigning two data bytes each consisting of eight data bits to the T1 cell; and
  transmitting the T1 cell at the data rate of 4.096 Mbps.

40. The method of claim 39, wherein the step of assigning the two data bytes to the T1 cell comprises the steps of assigning a first one of the data bytes to a first half of the sixteen time slots and assigning a second one of the data bytes to a second half of the sixteen time slots subsequent in sequence to the first half.

41. The method of claim 35, further comprising the step of providing thirty-two time slots within the T1 cell.

42. The method of claim 41, further comprising the steps of:
  assigning four data bytes each consisting of eight data bits to the T1 cell; and
  transmitting the T1 cell at the data rate of 8.192 Mbps.

43. The method of claim 42, wherein the step of assigning the four data bytes to the T1 cell comprises the step of byte-interleaving the four data bytes.

44. The method of claim 42, wherein the variable rate subscriber bus is capable of supporting four T1 channels for transporting T1 traffic through four T1 ports, the four T1 ports numbered consecutively as Port 0, Port 1, Port 2 and Port 3, the T1 ports capable of transferring Digital Signal 0 (DS0) octets each consisting of eight data bits.

45. The method of claim 44, wherein the T1 cell is included in a SONET frame having a plurality of subscriber bus cell slots, the subscriber bus cell slots including a protect state slot followed by a plurality of cell slots for carrying a plurality of T1 cells.

46. The method of claim 45, wherein each of the T1 cells is capable of carrying the DS0 octets for T1 Ports 0–3 in sequence.

47. The method of claim 35, further comprising the step of providing sixty-four cell slots within the T1 cell.

48. The method of claim 47, further comprising the steps of:
  assigning eight data bytes each consisting of eight data bits to the T1 cell; and
  transmitting the T1 cell at the data rate of 16.384 Mbps.

49. The method of claim 48, wherein the step of assigning the eight data bytes to the T1 cell comprises the step of byte-interleaving the eight data bytes.

50. A method of data transmission over a variable rate subscriber bus, the method comprising the steps of:
  (a) providing a synchronous optical network (SONET) frame;
  (b) dividing the SONET frame into a plurality of cell slots comprising a first cell slot and a plurality of subsequent cell slots in temporal sequence;
  (c) assigning a plurality of Digital Signal 0 (DS0) cells to at least some of the cell slots;
  (d) providing a clock signal at a predetermined clock frequency;
  (e) providing a plurality of predetermined data rates for the subscriber bus, the predetermined data rates including a basic data rate and at least one higher data rate which is an integral multiple of the basic data rate;
  (f) selecting one of the predetermined data rates as a selected data rate for transmitting the data; and
  (g) assigning a plurality of data bits to the DS0 cell in dependence upon the selected data rate.

51. The method of claim 50, further comprising the step of synchronizing the DS0 cells at a frame rate of 8 KHz based upon the SONET frame.

52. The method of claim 50, further comprising the step of providing a synchronous optical network (SONET) superframe having a duration of 1 ms, the subscriber bus super frame consisting of eight SONET frames.

53. The method of claim 52, further comprising the step of synchronizing the DS0 cells at a frame rate of 1 KHz based upon the subscriber bus superframe.

54. The method of claim 50, wherein the predetermined clock frequency is 4.096 MHz.

55. The method of claim 50, wherein the basic data rate is 2.048 megabits per second (Mbps).

56. The method of claim 55, the integral multiple is an integral power of 2.

57. The method of claim 56, wherein the predetermined data rates comprise a plurality of higher data rates of 4.096 Mbps, 8.192 Mbps and 16.384 Mbps.

58. The method of claim 57, further comprising the step of providing eight odd time slots and eight even time slots within each of the DS0 cells, the odd and even time slots interleaved with each other.

59. The method of claim 58, further comprising the steps of:
assigning a data byte consisting of eight data bits only to the odd time slots of each of the DS0 cells; and
transmitting the DS0 cells at the basic data rate of 2.048 Mbps.

60. The method of claim 57, further comprising the step of providing sixteen time slots within each of the DS0 cells.

61. The method of claim 60, further comprising the steps of:
assigning two data bytes to each of the DS0 cells; and
transmitting the DS0 cells at the data rate of 4.096 Mbps.

62. The method of claim 61, wherein the step of assigning the two data bytes to each of the DS0 cells comprises the steps of assigning a first one of the data bytes to a first half of the sixteen time slots and assigning a second one of the data bytes to a second half of the sixteen time slots subsequent in sequence to the first half.

63. The method of claim 57, further comprising the step of providing thirty-two time slots within each of the DS0 cells.

64. The method of claim 63, further comprising the steps of:
assigning four data bytes to each of the DS0 cells; and
transmitting the DS0 cells at the data rate of 8.192 Mbps.

65. The method of claim 64, wherein the step of assigning the four data bytes to each of the DS0 cells comprises the step of byte-interleaving the four data bytes within each of the DS0 cells.

66. The method of claim 57, further comprising the step of providing sixty-four time slots within each of the DS0 cells.

67. The method of claim 66, further comprising the steps of:
assigning eight data bytes to each of the DS0 cells; and
transmitting the DS0 cells at the data rate of 16.384 Mbps.

68. The method of claim 67, wherein the step of assigning the eight data bytes to each of the DS0 cells comprises the step of byte-interleaving the eight data bytes within each of the DS0 cells.

69. The method of claim 50, further comprising the step of assigning a first set of three DS0 cells to three of the cell slots immediately following the first cell slot in the SONET frame.

70. The method of claim 69, further comprising the steps of:
assigning a signaling cell to a fifth one of the cell slots immediately following the first set of three DS0 cells in the SONET frame; and
assigning a second set of three DS0 cells to three of the cell slots immediately following the signaling cell in the SONET frame.

71. The method of claim 70, further comprising the step of assigning a framing cell to a ninth one of the cell slots immediately following the second set of three DS0 cells in the SONET frame.

72. The method of claim 50, wherein the first cell slot comprises a reserved slot.

73. The method of claim 50, wherein the variable rate subscriber bus is capable of supporting a plurality of T1 channels, and wherein the first cell slot comprises a protect state slot.

74. The method of claim 50, wherein the variable rate subscriber bus is capable of transporting data over a plurality of DS1 channels.

75. A method of data transmission over a variable rate subscriber bus which is capable of supporting at least one T1 channel, the method comprising the steps of:
(a) providing a synchronous optical network (SONET) frame;
(b) dividing the SONET frame into a plurality of cell slots comprising a first cell slot and a plurality of subsequent cell slots in temporal sequence;
(c) assigning a plurality of T1 cells to at least some of the cell slots;
(d) providing a clock signal at a predetermined clock frequency;
(e) providing a plurality of predetermined data rates for the subscriber bus, the predetermined data rates including a basic data rate and at least one higher data rate which is an integral multiple of the basic data rate;
(f) selecting one of the predetermined data rates as a selected data rate for transmitting the data; and
(g) assigning a plurality of data bits to the T1 cell in dependence upon the selected data rate.

76. The method of claim 75, further comprising the step of synchronizing the T1 cells at a frame rate of 8 KHz based upon the SONET frame.

77. The method of claim 75, further comprising the step of providing a synchronous optical network (SONET) superframe having a duration of 1 ms, the subscriber bus superframe consisting of eight SONET frames.

78. The method of claim 77, further comprising the step of synchronizing the T1 cells at a frame rate of 1 KHz based upon the subscriber bus superframe.

79. The method of claim 75, wherein the predetermined clock frequency is 4.096 MHz.

80. The method of claim 75, wherein the basic data rate is 2.048 megabits per second (Mbps).

81. The method of claim 80, the integral multiple is an integral power of 2.

82. The method of claim 81, wherein the predetermined data rates comprise a plurality of higher data rates of 4.096 Mbps, 8.192 Mbps and 16.384 Mbps.

83. The method of claim 82, further comprising the step of providing eight odd time slots and eight even time slots within each of the T1 cells, the odd and even time slots interleaved with each other.

84. The method of claim 83, further comprising the steps of:
assigning a data byte consisting of eight data bits only to the odd time slots of each of the T1 cells; and
transmitting the T1 cells at the basic data rate of 2.048 Mbps.

85. The method of claim 82, further comprising the step of providing sixteen time slots within each of the T1 cells.

86. The method of claim 85, further comprising the steps of:
assigning two data bytes to each of the T1 cells; and
transmitting the T1 cells at the data rate of 4.096 Mbps.

87. The method of claim 86, wherein the step of assigning the two data bytes to each of the T1 cells comprises the steps of assigning a first one of the data bytes to a first half of the sixteen time slots and assigning a second one of the data bytes to a second half of the sixteen time slots subsequent in sequence to the first half.

88. The method of claim 82, further comprising the step of providing thirty-two time slots within each of the T1 cells.

89. The method of claim 88, further comprising the steps of:
assigning four data bytes to each of the T1 cells; and
transmitting the T1 cells at the data rate of 8.192 Mbps.

90. The method of claim 89, wherein the step of assigning the four data bytes to each of the T1 cells comprises the step of byte-interleaving the four data bytes within each of the T1 cells.

91. The method of claim 89, wherein the variable rate subscriber bus is capable of supporting four T1 channels for transporting T1 traffic through four T1 ports, the four T1 ports numbered consecutively as Port 0, Port 1, Port 2 and Port 3, the T1 ports capable of transferring Digital Signal 0 (DS0) octets each consisting of eight data bits.

92. The method of claim 91, wherein each of the T1 cells is capable of carrying the DS0 octets for T1 Ports 0–3 in sequence.

93. The method of claim 82, further comprising the step of providing sixty-four time slots within each of the T1 cells.

94. The method of claim 93, further comprising the steps of:
assigning eight data bytes to each of the T1 cells; and
transmitting the T1 cells at the data rate of 16.384 Mbps.

95. The method of claim 94, wherein the step of assigning the eight data bytes to each of the T1 cells comprises the step of byte-interleaving the eight data bytes within each of the T1 cells.

96. The method of claim 75, further comprising the step of assigning a first set of three T1 cells to three of the cell slots immediately following the first cell slot in the SONET frame.

97. The method of claim 96, further comprising the steps of:
assigning a signaling cell to a fifth one of the cell slots immediately following the first set of three T1 cells in the SONET frame; and
assigning a second set of three T1 cells to three of the cell slots immediately following the signaling cell in the SONET frame.

98. The method of claim 97, further comprising the step of assigning a framing cell to a ninth one of the cell slots immediately following the second set of three T1 cells in the SONET frame.

99. The method of claim 75, wherein the first cell slot comprises a reserved slot.

100. The method of claim 75, wherein the first cell slot comprises a protect state slot.

101. A variable rate subscriber bus, comprising:
(a) a clock channel capable of transferring a clock signal at a predetermined clock frequency; and
(b) a plurality of Digital Signal 0 (DS0) channels capable of transferring a plurality of DS0 cells at a selected one of a plurality of predetermined data rates for transferring the DS0 cells, the predetermined data rates including a basic data rate and at least one higher data rate, each of the DS0 cells carrying a plurality of data bits which are transferred at the selected data rate, the clock signal providing a timing reference to the data bits at any one of the predetermined data rates selected for transferring the DS0 cells.

102. The subscriber bus of claim 101, wherein the predetermined clock frequency is 4.096 MHz.

103. The subscriber bus of claim 101, wherein the basic data rate is 2.048 megabits per second (Mbps).

104. The subscriber bus of claim 103, wherein the higher data rate is a multiple of the basic data rate, the multiple being an integral power of 2.

105. The subscriber bus of claim 104, wherein the predetermined data rates comprise a plurality of higher data rates of 4.096 Mbps, 8.192 Mbps and 16.384 Mbps.

106. The subscriber bus of claim 105, wherein eight odd time slots and eight even time slots are provided within each of the DS0 cells, the odd and even time slots interleaved with each other.

107. The subscriber bus of claim 106, wherein each of the DS0 cells comprises eight data bits which are assigned only to the odd time slots, and wherein the DS0 cells are transferred at the basic data rate of 2.048 Mbps.

108. The subscriber bus of claim 105, wherein sixteen time slots are provided within each of the DS0 cells.

109. The subscriber bus of claim 108, wherein two data bytes each consisting of eight data bits are assigned to each of the DS0 cells, and wherein the DS0 cells are transferred at the data rate of 4.096 Mbps.

110. The subscriber bus of claim 109, wherein a first one of the two data bytes is assigned to a first half of the sixteen time slots, and wherein a second one of the two data bytes is assigned to a second half of the sixteen time slots subsequent in sequence to the first half.

111. The subscriber bus of claim 105, wherein thirty-two time slots are provided within each of the DS0 cells.

112. The subscriber bus of claim 111, wherein four data bytes each consisting of eight data bits are assigned to each of the DS0 cells, and wherein the DS0 cells are transferred at the data rate of 8.192 Mbps.

113. The subscriber bus of claim 112, wherein the four data bytes are byte-interleaved with each other.

114. The subscriber bus of claim 105, wherein sixty-four time slots are provided within each of the DS0 cells.

115. The subscriber bus of claim 114, wherein eight data bytes each consisting of eight data bits are assigned to each of the DS0 cells, and wherein the DS0 cells are transferred at the data rate of 16.384 Mbps.

116. The subscriber bus of claim 115, wherein the eight data bytes are byte-interleaved with each other.

117. The subscriber bus of claim 101, further comprising a superframe synchronization channel capable of transferring a timing pulse defining a synchronous optical network (SONET) superframe for synchronizing the DS0 cells.

118. The subscriber bus of claim 117, wherein the DS0 cells are synchronized at a frame rate of 1 KHz based upon the subscriber bus super frame which has a duration of 1 ms.

119. The subscriber bus of claim 101, further comprising a frame synchronization channel capable of transferring a timing pulse defining a synchronous optical network (SONET) frame for synchronizing the DS0 cells.

120. The subscriber bus of claim 119, wherein the DS0 cells are synchronized at a frame rate of 8 KHz based upon the SONET frame which has a duration of 125 µs.

121. The subscriber bus of claim 119, wherein the SONET frame comprises a first cell slot and a first set of three DS0 cells immediately following the first cell slot.

122. The subscriber bus of claim 121, wherein the SONET frame further comprises a signaling cell immediately following the first set of three DS0 cells and a second set of three DS0 cells immediately following the signaling cell.

123. The subscriber bus of claim 122, wherein the SONET frame further comprises a framing cell immediately following the second set of three DS0 cells.

124. The subscriber bus of claim 121, wherein the first cell slot comprises a reserved slot.

125. The subscriber bus of claim 121, wherein the first cell slot comprises a T1 protect state slot.

126. The subscriber bus of claim 101, wherein the DS0 channels are capable of transporting data in DS1 format.

127. A variable rate subscriber bus, comprising:
(a) a clock channel capable of transferring a clock signal at a predetermined clock frequency; and
(b) a plurality of T1 channels capable of transferring a plurality of T1 cells at a selected one of a plurality of predetermined data rates for transferring the T1 cells, the predetermined data rates including a basic data rate and at least one higher data rate, each of the T1 cells carrying a plurality of data bits which are transferred at the selected data rate, the clock signal providing a timing reference to the data bits at any one of the predetermined data rates selected for transferring the T1 cells.

128. The subscriber bus of claim 127, wherein the predetermined clock frequency is 4.096 MHz.

129. The subscriber bus of claim 127, wherein the basic data rate is 2.048 megabits per second (Mbps).

130. The subscriber bus of claim 129, wherein the higher data rate is a multiple of the basic data rate, the multiple being an integral power of 2.

131. The subscriber bus of claim 130, wherein the predetermined data rates comprise a plurality of higher data rates of 4.096 Mbps, 8.192 Mbps and 16.384 Mbps.

132. The subscriber bus of claim 131, wherein eight odd time slots and eight even time slots are provided within each of the T1 cells, the odd and even time slots interleaved with each other.

133. The subscriber bus of claim 132, wherein each of the T1 cells comprises eight data bits which are assigned only to the odd time slots, and wherein the T1 cells are transferred at the basic data rate of 2.048 Mbps.

134. The subscriber bus of claim 131, wherein sixteen time slots are provided within each of the T1 cells.

135. The subscriber bus of claim 134, wherein two data bytes each consisting of eight data bits are assigned to each of the T1 cells, and wherein the T1 cells are transferred at the data rate of 4.096 Mbps.

136. The subscriber bus of claim 135, wherein a first one of the two data bytes is assigned to a first half of the sixteen time slots, and wherein a second one of the two data bytes is assigned to a second half of the sixteen time slots subsequent in sequence to the first half.

137. The subscriber bus of claim 131, wherein thirty-two time slots are provided within each of the T1 cells.

138. The subscriber bus of claim 137, wherein four data bytes each consisting of eight data bits are assigned to each of the T1 cells, and wherein the T1 cells are transferred at the data rate of 8.192 Mbps.

139. The subscriber bus of claim 138, wherein the four data bytes are byte-interleaved with each other.

140. The subscriber bus of claim 131, wherein sixty-four time slots are provided within each of the T1 cells.

141. The subscriber bus of claim 140, wherein eight data bytes each consisting of eight data bits are assigned to each of the T1 cells, and wherein the T1 cells are transferred at the data rate of 16.384 Mbps.

142. The subscriber bus of claim 141, wherein the eight data bytes are byte-interleaved with each other.

143. The subscriber bus of claim 127, further comprising a superframe synchronization channel capable of transferring a timing pulse defining a synchronous optical network (SONET) superframe for synchronizing the T1 cells.

144. The subscriber bus of claim 143, wherein the T1 cells are synchronized at a frame rate of 1 KHz based upon the subscriber bus super frame which has a duration of 1 ms.

145. The subscriber bus of claim 127, further comprising a frame synchronization channel capable of transferring a timing pulse defining a synchronous optical network (SONET) frame for synchronizing the T1 cells.

146. The subscriber bus of claim 145, wherein the T1 cells are synchronized at a frame rate of 8 KHz based upon the SONET frame which has a duration of 125 µs.

147. The subscriber bus of claim 145, wherein the SONET frame comprises a first cell slot and a first set of three T1 cells immediately following the first cell slot.

148. The subscriber bus of claim 147, wherein the SONET frame further comprises a signaling cell immediately following the first set of three T1 cells and a second set of three T1 cells immediately following the signaling cell.

149. The subscriber bus of claim 148, wherein the SONET frame further comprises a framing cell immediately following the second set of three T1 cells.

150. The subscriber bus of claim 147, wherein the first cell slot comprises a protect state slot.

* * * * *